(12) United States Patent
Katoh et al.

(10) Patent No.: US 6,355,370 B2
(45) Date of Patent: *Mar. 12, 2002

(54) SOLID POLYELECTROLYTE FUEL CELL HAVING A SOLID POLYELECTROLYTE MEMBRANE WITH VARYING WATER CONTENT

(75) Inventors: Michiaki Katoh; Michio Asukabe; Chiaki Yamada; Shinji Nezu, all of Aichi-ken (JP)

(73) Assignee: Aisin Seiki Kabushiki Kaisha, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,735

(22) Filed: Nov. 27, 1998

(30) Foreign Application Priority Data

Nov. 27, 1997 (JP) ............................................. 9-326601
Dec. 15, 1997 (JP) ............................................. 9-345422

(51) Int. Cl.$^7$ ............................ H01M 8/10; H01M 2/00
(52) U.S. Cl. .............................. 429/30; 429/34; 429/41
(58) Field of Search .............................. 429/30, 34, 41

(56) References Cited

U.S. PATENT DOCUMENTS 5,817,718 A * 10/1998 Nezu et al. ................. 429/130
5,994,426 A * 11/1999 Nezu et al. .................. 429/30

FOREIGN PATENT DOCUMENTS

| JP | 6-231781 | 8/1994 |
| JP | 6-231782 | 8/1994 |
| JP | 6-231783 | 8/1994 |
| JP | 9-102322 | 4/1997 |

* cited by examiner

*Primary Examiner*—Carol Chaney
*Assistant Examiner*—Tracy Dove
(74) *Attorney, Agent, or Firm*—Oblon, Spivak, McClelland, Maier & Neustadt, P.C.

(57) ABSTRACT

A solid polyelectrolyte fuel cell has (a) a positive electrode, (b) a negative electrode, and (c) a solid polyelectrolyte membrane containing water, between the positive electrode and the negative electrode, where the water content of portions of the solid polyelectrolyte membrane adjacent to the negative electrode is greater than the water content of portions of the solid polyelectrolyte membrane adjacent to the positive electrode. The cell outputs high voltage and has good properties.

18 Claims, 2 Drawing Sheets

SOLID POLYELECTROLYTE FUEL CELL HAVING A SOLID POLYELECTROLYTE MEMBRANE WITH VARYING WATER CONTENT

BACKGROUND OF THE INVENTION

1. Field of the Invention

The present invention relates to a solid polyelectrolyte-type fuel cell.

2. Discussion of the Background

A solid polyelectrolyte-type fuel cell is considered to be a hopeful, small-sized lightweight power source for vehicles and other devices which uses hydrogen and oxygen as fuel. The cell comprises an ion-exchangeable, solid polyelectrolyte membrane, and a positive-electrode and a negative electrode disposed to be in contact with both sides of the membrane. The fuel hydrogen is electrochemically oxidized at the negative electrode to give protons and electrons. The protons pass through the polyelectrolyte membrane toward the positive electrode, which is fed oxygen. Electrons, having been formed at the negative electrode, travel to the positive electrode, where the protons and the electrons react with oxygen to form water.

The solid polyelectrolyte-type cell can operate at low temperatures and is small, while producing a high power output density. Therefore, many studies have been made on these cells for use as a power source for vehicles. Generally used in the cell is a sulfonic acid group-containing perfluorocarbon polymer membrane (e.g., NAFION, trade name of DuPont Co.; ACIPLEX, trade name of Asahi Chemical Co.) or the like as the polyelectrolyte membrane. However, the conventional fuel cell is not still satisfactory, because its output is not high enough.

In order to increase the output of the cell, the hydrogen ion conductivity of the polyelectrolyte membrane therein must be increased to thereby lower the internal resistance of the cell. For this, the concentration of the ion-exchanging groups (for example, sulfonic acid groups) existing in the polyelectrolyte membrane may be increased and the thickness of the membrane may be reduced. However, too great an increase in the ion-exchanging group concentration in the membrane results in an increase in the water content of the membrane, and is therefore problematic in that the positive electrode at which water is formed through cell reaction becomes too wet, lowering the cell output.

On the other hand, the reduction in the thickness of the membrane is also problematic in that the mechanical strength of the membrane is reduced, and that the amount of fuel, (hydrogen gas and oxygen gas) passing through the membrane is increased, lowering the cell-output efficiency.

One prior technique is disclosed in Japanese Patent Application Laid-open (JP-A) Hei-6-231781. A cation-exchanging membrane of a laminate, composed of at least two layers of a sulfonic acid group-containing perfluorocarbon polymer, in which the layers each have a different water content, is used as the solid electrolyte membrane, so that the membrane may have low electric resistance. In the solid polyelectrolyte-type fuel cell disclosed therein, a plurality of polymer films, each having a different water content, are so laminated to construct the polyelectrolyte membrane that their water content varies to increase from the positive electrode side to the negative electrode side.

Another prior technique is disclosed in JP-A Hei-6-231782. The polyelectrolyte-type fuel cell disclosed therein comprises a laminate membrane of at least two, sulfonic acid group-containing perfluorocarbon polymer films, each having a different water content, in which the water content of the polymer film facing the positive electrode is made larger than that of the polymer film facing the negative electrode, in order that the laminate membrane may have low electric resistance.

However, the former, in which the water content of the laminate membrane greatly varies around the lamination boundaries, suffers from the problem that some stress is generated around the boundaries, thereby lowering the mechanical durability of the membrane. In addition, in the former, the discontinuous variation in the water content of the laminate membrane interferes with efficient back diffusion of water from the positive electrode that compensates for the reduction in the water content of the membrane adjacent to the negative electrode, whereby the cell can not produce a large output. On the other hand, in the latter, the positive electrode becomes too wet and the negative electrode has high resistance. In this, therefore, the increase in the cell output could not be attained.

In order to increase the output of the fuel cell of that type, the hydrogen ion conductivity of the polyelectrolyte membrane in the cell must be high and the internal resistance of the membrane must be small. The hydrogen ion conductivity and the internal resistance of the membrane are significantly influenced by the amount of ion-exchanging groups (for example, sulfonic acid groups) existing in the membrane and also by the water content of the membrane. Specifically, membranes having a higher ion-exchanging group content and a higher water content have a higher degree of hydrogen ion conductivity.

In the negative electrode side of the fuel cell, hydrogen ions derived from hydrogen gas pass through the polyelectrolyte membrane and move toward the side of the positive electrode. In the fuel cell, therefore, the water content of the membrane adjacent to the negative electrode is lowered, thereby causing the reduction in the cell output. On the other hand, water is formed through cell reaction in the membrane adjacent to the positive electrode so that excess water exists therein. As a result, therefore, it is presumed that such excess water will cover the catalyst, and interfere with gas diffusion, thereby causing a reduction in the cell output.

Still another prior technique is disclosed in JP-A Hei-6-231783. In the polyelectrolyte-type fuel cell disclosed therein, the solid polyelectrolyte membrane is of a cation exchanging membrane having a laminate structure of at least three layers of a sulfonic acid group-containing perfluorocarbon polymer each having a different water content, in which the water content of the polymer film layers adjacent to the positive electrode and to the negative electrode is larger than that of the interlayer polymer film.

In the three prior techniques noted above, the solid polyelectrolyte membrane is a sulfonic acid group-containing perfluorocarbon polymer. In those, a plurality of such polymer layers each having a different water content are laminated to construct the solid polyelectrolyte membrane, in order to increase the cell output.

However, the starting materials, such as tetrafluoroethylene, 2-fluorosulfonyl-perfluoroethyl vinyl ether and others for the polymer, are extremely expensive, and the high price of these materials is fixed, and are unlikely to significantly fall in the future. In addition, the polymer is further problematic in that it requires complicated polymerization steps to be followed by the final step of sheeting it into thin films. As a result, if the polymer is used in producing fuel cells for electric cars, the price of each fuel cell produced is high and will be equal to the price of the car itself. For the same reasons as above, the polymer could not be used in producing fuel cells for leisure appliances. Therefore, using the polymer in producing practical fuel cells is not practicable at present.

SUMMARY OF THE INVENTION

Given the situation, the present invention is to provide a high-output, solid polyelectrolyte-type fuel cell which is characterized in that the water content of the polyelectrolyte membrane in the cell is not uniform, but rather continuously varies in the direction of the thickness of the membrane in such a manner that the water content is highest in the side of the membrane adjacent to the negative electrode, and is lowest in the side thereof adjacent to the positive electrode. As a result, in the cell of the invention, the surface of the membrane repels water and promotes the back-diffusion of water from the positive electrode, which compensates for the water content loss in the membrane adjacent to the negative electrode, and therefore the positive electrode is prevented from becoming to wet and the catalytic action in the cell is promoted to increase the cell output.

The invention also provides a high-output, solid electrolyte-type fuel cell in which the polyelectrolyte membrane is of a laminate of at least two layers each having a different water content so as to optimize the water retentiveness of the membrane that faces the positive electrode and the negative electrode. This is based on the technical idea of the applicant's own invention in a prior patent application of JP-A Hei-9-102322, hereby incorporated by reference. As in the prior application, an ethylene-tetrafluoroethylene copolymer (ETFE) film base is exposed to radiation, then grafted with styrene at the resulting radicals, and thereafter sulfonylated with chlorosulfonic acid and hydrolyzed with an alkali or acid to thereby introduce sulfonic acid groups into the grafted copolymer. The solid-polyelectrolyte composition thus produced is based on the ETFE film, and is produced through irradiation followed by grafting.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

To solve the problems noted above, a first aspect of the invention is a solid polyelectrolyte-type fuel cell in which the water content of the solid polyelectrolyte membrane is controlled so that the water content thereof adjacent to the negative electrode is higher than the water content thereof adjacent to the positive electrode, relative to the thickness of the membrane.

In a second aspect, the water content of the solid polyelectrolyte membrane in the cell is controlled so that it varies continuously from the side adjacent to the negative electrode to the side adjacent to the positive electrode in the direction of the thickness of the membrane.

In a third aspect, the water content of the membrane adjacent to the negative electrode in the cell is at least 5% by weight larger than that adjacent to the positive electrode. If the difference in the water content is smaller than 5% by weight, the back diffusion of water from the positive electrode to the negative electrode is not efficient.

In a fourth aspect, the water content of the solid polyelectrolyte membrane in the cell is controlled so that it varies continuously from the side adjacent to the negative electrode to the side adjacent to the positive electrode in the direction of the thickness of the membrane, within a range falling between 30 and 200% by weight. If the water content variation is smaller than 30% by weight, the inner resistance of the membrane will be high; but if it is larger than 200% by weight, the mechanical properties of the membrane will be poor, or that is, the membrane will be hard and brittle.

In a fifth aspect, the water content of the solid polyelectrolyte membrane in the cell is controlled by controlling the ion-exchanging capacity of the membrane.

In a sixth aspect, the water content of the solid electrolyte membrane in the cell is controlled by controlling the degree of crosslinking in the membrane.

In a seventh aspect, the solid polyelectrolyte membrane in the cell is a copolymer comprising a main chain formed through copolymerization of a fluorocarbon vinyl monomer and a hydrocarbon vinyl monomer, and sulfonic acid group-containing hydrocarbon side chains.

In an eighth aspect of the invention, the solid polyelectrolyte membrane in the cell is a copolymer comprising a main chain formed through copolymerization of an olefinic perfluorocarbon and an olefinic hydrocarbon, and side chains of a crosslinked polymer of a sulfonic acid group-containing olefinic hydrocarbon and a diolefinic hydrocarbon.

In a ninth aspect of the invention, the solid polyelectrolyte membrane in the cell is a cation-exchanging membrane of a copolymer that comprises a main chain formed through copolymerization of a fluorocarbon vinyl monomer and a hydrocarbon vinyl monomer, and sulfonic acid group-containing hydrocarbon side chains. In this, the cation-exchanging membrane is a laminate of at least two layers each having a different water content, and the water content of the membrane adjacent to the negative electrode is higher than that adjacent to the positive electrode.

In a tenth aspect, the main chain in the copolymer for the solid polyelectrolyte membrane in the cell is represented by formula I:

(I)

wherein $R^1$ represents a fluorine atom, or a fluoroalkyl group having from 1 to 3 carbon atoms; $R^2$ represents a hydrogen atom, or an allyl group having from 1 to 3 carbon atoms; m represents an integer of 1 or more; and n represents an integer of 1 or more,
and the side chains are represented by formula II:

(II)

wherein $R^3$, $R^4$ and $R^5$ each represent a hydrogen atom, or an alkyl group having from 1 to 3 carbon atoms; s represents an integer of 1 or more; and t represents 0 or an integer of 1 or more.

In an eleventh aspect, the main chain in the copolymer for the solid polyelectrolyte membrane in the cell is an ethylene-tetrafluoroethylene copolymer.

In a twelfth aspect, the side chains in the copolymer for the solid polyelectrolyte membrane in the cell are styrene-sulfonic acid polymers.

In a thirteenth aspect, the copolymer for the cation-exchanging membrane for the solid polyelectrolyte membrane in the cell is exposed to a controlled dose of γ-radiation or electron radiation to change the degree of grafting on its main chain, the main chain being a copolymer of a fluorocarbon vinyl monomer and a hydrocarbon vinyl monomer, to thereby control the water content of the membrane.

In a fourteenth aspect, the degree of grafting on the main chain of the copolymer for the cation-exchanging membrane for the solid polyelectrolyte membrane in the cell is varied by changing the grafting temperature and the grafting time, to thereby control the water content of the membrane. In this, the main chain is a copolymer of a fluorocarbon vinyl monomer and a hydrocarbon vinyl monomer.

In order to continuously vary the water content of the polyelectrolyte membrane in the direction of the thickness of the membrane, in the cell of the invention, the ion-exchanging group content of the membrane and also the degree of crosslinking in the membrane may be continuously varied. For example, where the polyelectrolyte membrane is formed from a copolymer that comprises a main chain formed through copolymerization of an olefinic perfluorocarbon and an olefinic hydrocarbon, and side chains of a crosslinked copolymer of a sulfonic acid group-containing olefinic hydrocarbon and a diolefinic hydrocarbon, the concentration of the sulfonic acid groups in the side chains themselves or to be added to the side chains, is varied in the direction of the thickness of the membrane, or alternatively, the degree of crosslinking with the diolefinic hydrocarbon is varied, whereby the water content of the resulting membrane may be controlled in the intended manner.

Concretely, when side chains are introduced into the film of a main chain copolymer, the material for the side chains or the crosslinking material is contacted with only one surface of the film, whereby the concentration of the side chains thus formed in the film or the degree of crosslinking in the film may be controlled in the intended manner. Alternatively, when sulfone groups are introduced into the side chains of the copolymer of the film, the sulfonating agent is contacted with only one surface of the film, whereby the concentration of the sulfonic acid group in the film may be continuously varied in the direction of the thickness of the film.

The water content, ΔW of the polymer film (acid type) for use in the invention is defined as follows:

$$\Delta W=(W_1/W_2-1)\times 100 \text{ (\% by weight)}$$

wherein
$W_1$ indicates the weight of the film having been dipped in pure water at 80° C. for 3 hours; and
$W_2$ indicates the weight of the film having been dried in vacuum at 100° C. for 24 hours after its $W_1$ was measured.

An ETPE (ethylene-tetrafluoroethylene copolymer) film having a thickness of from 5 to 500 μm, which is a base for the solid polyelectrolyte membrane in the cell of the invention, is exposed to radiation, such as γ-radiation or electron radiation, at a dose of from 1 to 100 kGy, and the resulting radicals are contacted with an alkenylbenzene such as styrene or the like.

In forming the graft-polymerizing side chains in the main chain copolymer, at which the polymerizing alkenylbenzene is grafted, the dose of the γ-radiation or electron radiation to be applied to the copolymer may be varied so as to control the degree of the grafting reaction in the copolymer, or that is, to control the degree of grafting therein. Noting this, the dose is varied within a range of from 1 to 100 kGy, and at least two membranes of the copolymer, each having a different degree of grafting, are prepared.

Next, at least two of these membranes are laminated in order of the dose applied thereto, and are further grafted with the monomer noted above at a temperature falling between 40 and 100° C. for 10 minutes to 50 hours.

As a result, under the same grafting condition, the membrane which a higher dose has been applied shall have a higher degree of grafting than that to which a lower dose has been applied. Next, the resulting laminate is sulfonated with a sulfonating agent, such as sulfuric acid, fuming sulfuric acid, chlorosulfonic acid or the like, sufficiently to the depth of the laminate. For this, the sulfonation of the laminate is effected with the sulfonating agent, which is not diluted or diluted 500-fold with a solvent such as 1,1,2,2-tetrachloroethane, 1,2-dichloroethane or the like, capable of swelling the ETFE films, at a temperature falling between room temperature (20° C.) and 100° C., for 10 minutes to 10 hours.

As a result, the films exposed to a larger dose of radiation have a higher degree of grafting, and have a larger amount of sulfonyl groups introduced through the sulfonation, while those exposed to a smaller dose of the radiation have a smaller amount of sulfonyl groups.

Next, the laminate is hydrolyzed. For this, for example, the laminate is dipped in an alkaline aqueous solution of 0.01 to 10 N potassium hydroxide, sodium hydroxide or the like, at a temperature falling between room temperature and 100° C., and then dipped in an acidic aqueous solution of sulfuric acid, hydrochloric acid or the like at a temperature falling between room temperature and 100° C. As a result, the sulfonyl groups having been introduced into the films through the previous sulfonation are converted into sulfonic acid groups, and the resulting laminate has the intended water absorbability and ion-exchangeability.

Accordingly, the films having been exposed to a larger dose of radiations have a larger number of sulfonic acid groups and have a higher water content. In the laminate for which a plurality of films are so laminated, those nearer to the negative electrode are exposed to a larger dose of radiation, the films nearer to the negative electrode shall have a higher water content; those nearer to the positive electrode have a lower water content.

Next, gas diffusion electrodes for the negative electrode and the positive electrode are disposed, with the laminate, of which the water content varies in the manner mentioned above, sandwiched therebetween, in such a manner that the platinum-carried carbon catalyst-coated surface of each electrode faces the surface of the laminate membrane, and they are pressed together under heat. In this manner, the laminate membrane is integrated with the positive electrode and the negative electrode to construct a cell. Next, a plurality of the thus-integrated cells are stacked up to construct a fuel cell stack. As fuel, hydrogen is fed into the cell stack at the side of the negative electrode, while oxygen is fed therein to at the side of the positive electrode as an oxidizing agent, and the cell stack is driven to generate electric power.

In the embodiment of the invention mentioned above, the method employed comprises exposing plural membranes to radiation at different doses varying within a range of from 1 to 100 kGy, and this is based on the findings that, in the formation of graft polymer chains of a polymerizing alkenylbenzene, a variation in the dose of γ or electron radiation to be applied to the main chain polymer membranes brings about a variation in the degree of grafting reaction, or that is, the variation in the degree of grafting in the resulting membranes. In place of this method, also employable herein, is a different method in which the grafting temperature is controlled within a range falling between 40 and 100° C. and the grafting time is also controlled within a range falling between 10 minutes and 50 hours under a predetermined grafting condition, to thereby produce a plurality of graft polymer membranes each having a different degree of grafting polymerization, or that is, a different degree of grafting.

In the solid polyelectrolyte-type fuel cell of the invention, the water content of the polyelectrolyte membrane is not uniform but continuously varies in the direction of the thickness of the membrane in such a manner that the water content thereof adjacent to the negative electrode is the highest while that adjacent to the positive electrode is the lowest. As a result, it is believed that, in the cell of the invention, the surface of the membrane repels water and promotes the back diffusion of water from the positive electrode, which is to compensate for the water content loss in the membrane adjacent to the negative electrode, whereby the positive electrode is prevented from being too wet and the catalytic action in the cell is promoted to increase the cell output.

In the fuel cell of the invention, the plural polyelectrolyte membranes are laminated that so the water content of the laminate membrane adjacent to the negative electrode is higher so as to facilitate the movement of water along with protons from the negative electrode side to the positive electrode side. Therefore, the fuel cell can be driven stably, and its output capabilities are improved.

EXAMPLES

Having generally described this invention, a further understanding can be obtained by reference to certain specific examples which are provided herein for purposes of illustration only and are not intended to be limiting unless otherwise specified.

Example 1

An ethylene-tetrafluoroethylene copolymer film (thickness: 50 μm) was exposed to 10 kGy of γ-radiation in air at room temperature, and then grafted with styrene at 60° C. for 2 hours in such a manner that one surface of the film was contacted with a mixture of 100 parts by volume of styrene and 20 parts by volume of xylene while the other surface thereof was contacted with xylene. After drying, the film was sulfonated by contacting both surfaces of the film with a mixture of 5 parts by volume of chlorosulfonic acid and 60 parts by volume of 1,2-dichloroethane at room temperature for 1 hour. After drying, the film was hydrolyzed in 1 N potassium hydroxide, and then dipped in 1 N hydrochloric acid. Next, the film was washed with water at 90° C. for 1 hour. The thus-prepared, solid polyelectrolyte membrane had an ion-exchanging capacity of 1.69 milliequivalents/g, and a water content at 80° C. of 71% by weight. The contact angle with water of the membrane on the surface that had been contacted with styrene in the grafting reaction was 30°, and that on the surface that had been contacted with xylene was 72°. (The contact angle with water of the starting ethylene-tetrafluoroethylene copolymer film was 110°.) The difference in the contact angle between both surfaces indicates that the surface on which the contact angle was smaller had a larger number of sulfonic acid groups and was therefore hydrophilic. On the other hand, a γ-radiation exposed film, similar to the above, but having a thickness of 25 μm, was grafted in a mixture of 100 parts by volume of styrene and 20 parts by volume of xylene and then processed in the same manner as above. As a result, the thus-processed film had an ion-exchanging capacity of 1.80 milliequivalents/g and a water content at 80° C. of 86% by weight From this, it is known that one surface of the solid polyelectrolyte membrane produced herein had the highest water content of around 86% by weight and that the water content of the membrane gradually decreased in the direction of the thickness of the membrane.

Commercially-available carbon paper was coated with TEFLON dispersion and then burned to make it water-repellent. One surface of the thus-processed paper was coated with a mixture of commercially-available, platinum-carried carbon (platinum: 40% by weight), commercially-available NAFION solution and isopropanol, in an amount of 0.35 mg/cm$^2$ in terms of platinum, to prepare a gas diffusion electrode.

The gas diffusion electrode was used as the positive electrode and the negative electrode. The solid polyelectrolyte membrane prepared above was sandwiched between both electrodes and pressed under heat to construct a fuel cell. The V-I characteristics of the fuel cell were measured at a hydrogen pressure of 2.5 atmospheres (utilization: 80%), an air pressure of 2.5 atmospheres (utilization: 40%) and a cell temperature of 80° C. As a result, the output voltage of the cell was 0.52 V at a current density of 1 A/cm$^2$.

Example 2

A solid polyelectrolyte membrane was prepared in the same manner as in Example 1, except that a mixture of 100 parts by volume of styrene and 30 parts by volume of xylene and a mixture of 95 parts by volume of styrene, 5 parts by volume of divinylbenzene and 30 parts by volume of xylene were used for the grafting reaction. The membrane prepared herein had an ion-exchanging capacity of 1.63 milliequivalents/g, and a water content at 80° C. of 69% by weight The contact angle with water of the membrane on the surface that had been contacted with the divinylbenzene-containing mixture in the grafting reaction was 52°, and that on the surface that had been contacted with the divinylbenzene-free mixture was 33°. On the other hand, the same films were grafted separately with the two grafting mixtures. One having been grafted with the divinylbenzene-containing mixture had an ion-exchanging capacity of 1.72 milliequivalents/g and a water content at 80° C. of 61% by weight, while the other having been grafted with the divinylbenzene-free mixture had an ion-exchanging capacity of 1.74 milliequivalents/g and a water content at 80° C. of 78% by weight From these data, it is known that the water content of the solid polyelectrolyte membrane produced herein gradually varies from about 61 to 78% by weight in the direction of the thickness of the membrane.

Using the membrane prepared herein and the same gas diffusion electrodes as in Example 1, a fuel cell was constructed in the same manner as in Example 1. The V-I characteristic of the cell was measured under the same condition as in Example 1. As a result, the output voltage of the cell was 0.50 V at a current density of 1 $A/cm^2$.

Example 3

A solid polyelectrolyte membrane was prepared in the same manner as in Example 1, except that the two reactions for grafting and sulfonation were effected in the manner mentioned below. In this, the irradiated film was grafted by keeping both its surfaces in contact with a mixture of 100 parts by volume of styrene and 30 parts by volume of xylene at 60° C. for 2 hours. Then, after having been dried, the grafted film was sulfonated at 40° C. for 1 hour with one surface being kept in contact with a mixture of 5 parts by volume of chlorosulfonic acid and 60 parts by volume of 1,2-dichloroethane, with the other surface being kept in contact with 1,2-dichloroethane only. The membrane prepared herein had an ion-exchanging capacity of 1.59 milliequivalents /g, and a water content at 80° C. of 68% by weight. The contact angle with water of the membrane on the surface that had been contacted with the chlorosulfonic acid-containing mixture in the sulfonation was 31°, and that on the surface that had been contacted with the chlorosulfonic acid-free mixture was 71°. On the other hand, a γ-radiation exposed film similar to the above, but having a thickness of 25 μm, was grafted in the same manner as above, then sulfonated with both its surfaces in contact with a mixture of 5 parts by volume of chlorosulfonic acid and 60 parts by volume of 1,2-dichloroethane, and thereafter processed in the same manner as above. As a result, the thus-processed film had an ion-exchanging capacity of 1.76 milliequivalents/g and a water content at 80° C. of 81% by weight. From this, it is known that one surface of the solid polyelectrolyte membrane produced herein had the highest water content of around 81% by weight and that the water content of the membrane gradually decreases in the direction of the thickness of the membrane.

Using the membrane prepared herein and the same gas diffusion electrodes as in Example 1, a fuel cell was constructed in the same manner as in Example 1. The V-I characteristics of the cell were measured under the same condition as in Example 1. As a result, the output voltage of the cell was 0.48 V at a current density of 1 $A/cm^2$.

Comparative Example 1

A solid polyelectrolyte membrane was prepared in the same manner as in Example 1, except that both surfaces of the film were grafted with a mixture of 100 parts by volume of styrene and 30 parts by volume of xylene. The membrane prepared herein had an ion-exchanging capacity of 1.71 milliequivalents/g, and a water content at 80° C. of 73% by weight. The contact angle with water of the membrane was 28°.

Using the membrane prepared herein and the same gas diffusion electrodes as in Example 1, a fuel cell was constructed in the same manner as in Example 1. The V-I characteristics of the cell were measured under the same condition as in Example 1. As a result, the output voltage of the cell was 0.42 V at a current density of 1 $A/cm^2$.

Example 4

Two base films of ETFE each having a thickness of 25 μm and an area of 10 $cm^2$ were, after having been washed with acetone, exposed to γ-radiation from Co60 at a dose of 6 kGy and 10 kGy, respectively. These two irradiated films were placed one upon another and put in a reactor tube, to which was added 50 ml of styrene, and the reactor tube was fully purged with nitrogen. Next, the reactor tube was dipped in a bath at 60° C., and the films therein were grafted for 15 hours. Next, the films were each washed three times with 100 ml of benzene each, and dried in a drier. The two films both having been grafted under the same condition but having been irradiated at different doses had different degrees of grafting of 38% and 55%, respectively.

Next, the two films were dipped in and reacted with a mixture of 30 parts (by weight—the same shall apply hereunder) of chlorosulfonic acid and 70 parts of 1,1,2,2-tetrachloroethane, at room temperature for 30 minutes in a nitrogen atmosphere, and then washed with 1,1,2,2-tetrachloroethane to remove the remaining chlorosulfonic acid therefrom. Then, these were further washed with ion-exchanged water.

Next, these films were dipped in an aqueous solution of 2 N potassium hydroxide at 100° C. for 30 minutes, and then in an aqueous solution of 1 N sulfuric acid at 100° C. for 30 minutes, and thereafter fully washed with ion-exchanged water. The ion-exchanging capacity of the resulting membranes were measured to be 1.7 and 2.1 meq/g, respectively. These were sandwiched between gas diffusion electrodes each having a platinum content of 0.4 $mg/cm^2$, and set in a hot press, in which they were pressed together at 100° C. and under 20 $kg/cm^2$ for 5 minutes, then at 130° C. and under 20 $kg/cm^2$ for 5 minutes, then at 165° C. and under 20 $kg/cm^2$ for 5 minutes, and finally at 165° C. and under an increased pressure of 80 $kg/cm^2$ for 90 seconds. Thus a membrane-electrode structure was obtained. Using this, a cell was constructed and tested for its output characteristics. The test data are in FIG. 1, which shows the time-dependent variation in the output voltage of the cell.

Comparative Example 2

The same process as in Example 4 was repeated, except that an ETFE film having a thickness of 50 μm was used as the base film and was exposed to γ-radiation at a dose of 10 kGy. The degree of grafting and the ion-exchanging capacity of the film were 53% and 2.0 meq/g, respectively.

Using the single membrane prepared herein and the same electrodes as in Example 4, a membrane-electrode structure was produced through thermal pressing under the same condition as in Example 4. Using the membrane-electrode structure, a cell was constructed and tested for its output characteristics. The test data are in FIG. 2, which shows the time-dependent variation in the output voltage of the cell.

Figure 1:
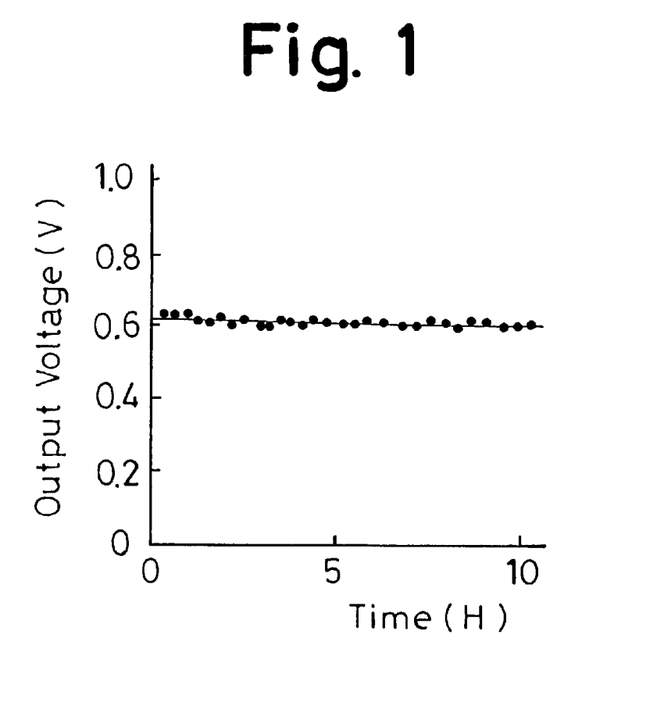
FIG. 1 is a graph showing the time-dependent variation in the output voltage of the cell of Example 4.
Figure 2:
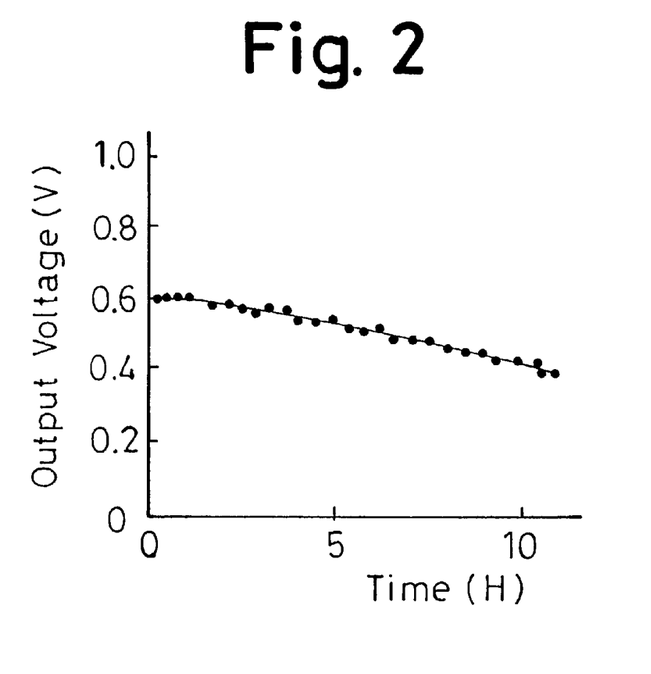
FIG. 2 is a graph showing the time-dependent variation in the output voltage of the cell of Comparative Example 2.

As is shown in FIG. 1 and FIG. 2, the output voltage of the cell of Example 4 of the invention did not decrease with the lapse of time, but that of the cell of Comparative Example 2 did decrease. This supports the practical usefulness of the cell of Example 4.

Example 5

Two base films of ETFE each having a thickness of 25 μm and an area of 10 $cm^2$ were, after having been washed with acetone, exposed to γ-radiation from Co60 at a dose of 6 kGy. These two irradiated films were put in different reactor tubes, to which was added 25 ml of styrene each. Then, the reactor tubes were fully purged with nitrogen. Next, the reactor tubes were dipped in a bath at 60° C., and the films therein were grafted for 15 hours and 25 hours, respectively. Next, the films were washed three times with 100 ml of benzene each, and dried in a drier. The two films thus had different degrees of grafting of 39% and 52%, respectively.

Next, the two films were placed one upon another, and dipped in and reacted with a mixture of 30 parts (by weight—the same shall apply hereunder) of chlorosulfonic acid and 70 parts of 1,1,2,2-tetrachloroethane, at room temperature for 30 minutes in a nitrogen atmosphere, and then washed with 1,1,2,2-tetrachloroethane to remove the remaining chlorosulfonic acid therefrom. Then, these films were further washed with ion-exchanged water. Next, these films were dipped in an aqueous solution of 2 N potassium hydroxide at 100° C. for 30 minutes, and then in an aqueous solution of 1 N sulfuric acid at 100° C. for 30 minutes, and thereafter fully washed with ion-exchanged water. The ion-exchanging capacity of the resulting membranes were measured to be 1.7 and 2.0 meq/g, respectively.

These membranes were sandwiched between gas diffusion electrodes each having a platinum content of 0.4 mg/cm$^2$, and set in a hot press, in which these were pressed together at 100° C. and under 20 kg/cm$^2$ for 5 minutes, then at 130° C. and under 20 kg/cm$^2$ for 5 minutes, then at 165° C. and under 20 kg/cm$^2$ for 5 minutes, and finally at 165° C. and under an increased pressure of 80 kg/cm$^2$ for 90 seconds. Thus was obtained a membrane-electrode structure. Using this, a cell was constructed and tested for its output characteristics. The test data are in FIG. 3, which shows the time-dependent variation in the output voltage of the cell.

Comparative Example 3

The same process as in Example 4 was repeated, except that an ETFE film having a thickness of 50 μm was used as the base film and that this was grafted at 60° C. for 25 hours. The degree of grafting and the ion-exchanging capacity of the film were 50% and 1.9 meq/g, respectively.

Using the single membrane prepared herein and the same electrodes as in Example 4, a membrane-electrode structure was produced through thermal pressing under the same condition as in Example 4. Using the membrane-electrode structure, a cell was constructed and tested for its output characteristics. The test data are in FIG. 4, which shows the time-dependent variation in the output voltage of the cell.

Figure 3:
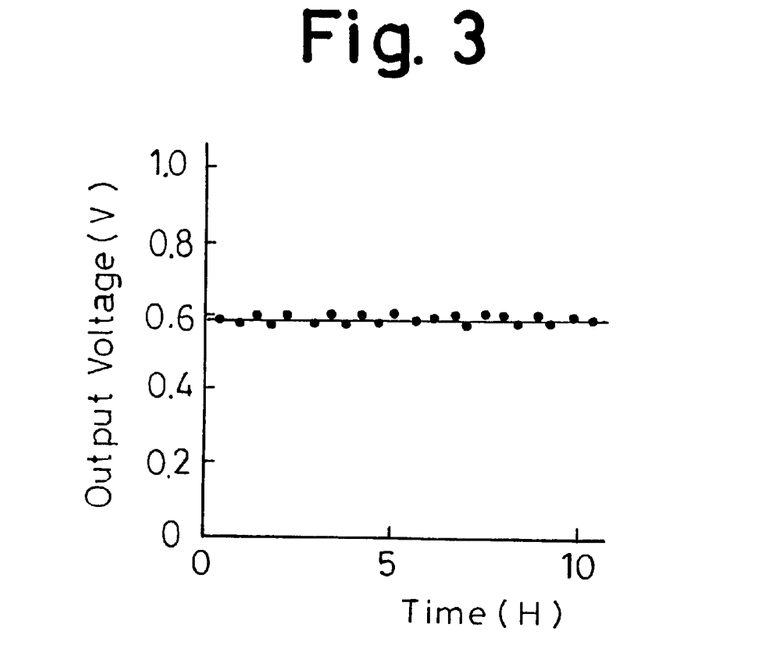
FIG. 3 is a graph showing the time-dependent variation in the output voltage of the cell of Example 5.
Figure 4:
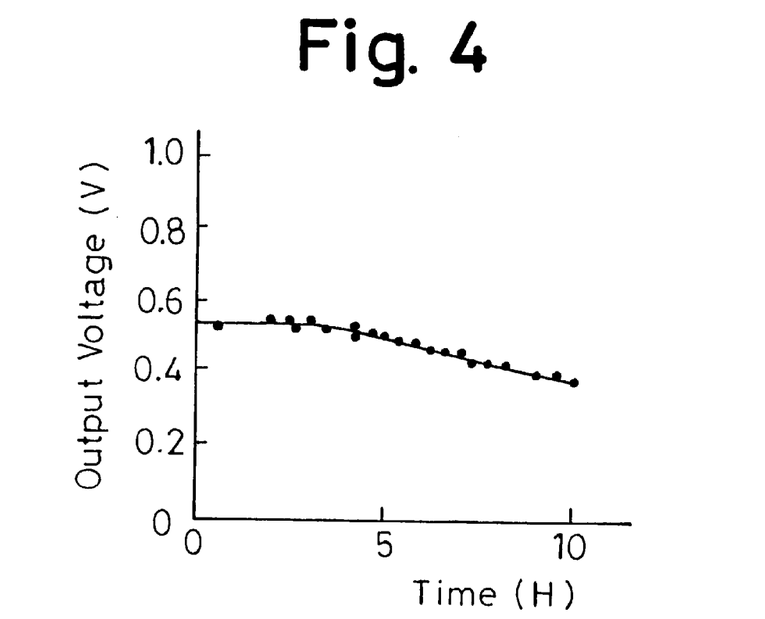
FIG. 4 is a graph showing the time-dependent variation in the output voltage of the cell of Comparative Example 3.

As is shown in FIG. 3 and FIG. 4, the output voltage of the cell of Example 5 of the invention did not decrease with the lapse of time, but that of the cell of Comparative Example 3 decreased. This supports the practical usefulness of the cell of Example 5.

As in its construction and production method mentioned above, the solid polyelectrolyte-type fuel cell of the invention has the following advantages:

1. The polyelectrolyte membranes in the cell are laminated so that the water content of the laminate membrane adjacent to the negative electrode is higher so as to facilitate the movement of water along with protons from the negative electrode side to the side of the positive electrode side while the cell is driven to generate electric power. Therefore, the cell can be driven stably, and its output capabilities are improved.

2. Plural polymer films, while being placed one upon another, can be grafted and sulfonated and are fused together along with the reaction. In addition, while the laminate membrane is integrated with electrodes through thermal pressing, the adhesiveness between the laminated films is further increased. Therefore, the laminate membrane does not require any additional step for specifically bonding and adhering the laminated films together.

3. The solid polyelectrolyte-type laminate membrane can be produced through irradiation and grafting polymerization, and the production costs are therefore significantly reduced. Therefore, the cell can be produced at low cost and is favorably used in various fields of electric cars, leisure appliances, etc.

Further advantages of the solid polyelectrolyte-type cell of the invention are mentioned below.

In the cell, the water content of the polyelectrolyte membrane is suitably controlled relative to the adjacent positive electrode and negative electrode. Therefore, the power output of the cell is high, and the properties of the cell are good.

In the cell in which the solid polyelectrolyte membrane is a cation-exchanging membrane of a copolymer that comprises a main chain as formed through copolymerization of a fluorocarbon vinyl monomer and a hydrocarbon vinyl monomer, and sulfonic acid group-containing hydrocarbon side chains, the cation-exchanging membrane is a laminate of at least two layers each having a different water content, and the water content of the membrane adjacent to the negative electrode is higher than that adjacent to the positive electrode. Specifically, in the cell, the polymer films are so laminated that the water content of the laminate membrane adjacent to the negative electrode is higher so as to facilitate the movement of water along with protons from the negative electrode side to the positive electrode side while the cell is driven to generate electric power. Therefore, the cell can be driven stably, and its outputting capabilities are improved. In addition, the cell can be produced at low cost.

Obviously, numerous modifications and variations of the present invention are possible in light of the above teachings. It is therefore to be understood that within the scope of the appended claims, the invention may be practiced otherwise than as specifically described herein.

The priority documents of the present application, Japanese Patent Application Nos. 09-326601 and 09-345422, filed on Nov. 27 and Dec. 15, 1997, respectively, are hereby incorporated by reference.

What is claimed is:

1. A solid polyelectrolyte fuel cell, comprising:
    (a) a positive electrode,
    (b) a negative electrode, and
    (c) a solid polyelectrolyte membrane containing water, between said positive electrode and said negative electrode,
    wherein the ion-exchanging capacity of a portion of said solid polyelectrolyte membrane adjacent to said negative electrode is greater than the ion-exchanging capacity of a portion of said solid polyelectrolyte membrane adjacent to said positive electrode, and
    the ion-exchanging capacity of said solid polyelectrolyte membrane varies continuously from said portion of said solid polyelectrolyte membrane adjacent to said negative electrode to said portion of said solid polyelectrolyte membrane adjacent to said positive electrode.

2. The solid polyelectrolyte fuel cell of claim 1, wherein said solid polyelectrolyte membrane comprises a copolymer comprising main chains and side chains, said main chains formed by copolymerizating fluorocarbon vinyl monomers and hydrocarbon vinyl monomers, and said side chains are sulfonic acid group-containing hydrocarbon side chains.

3. The solid polyelectrolyte fuel cell of claim 1, wherein said solid polyelectrolyte membrane comprises a copolymer comprising main chains and side chains, said main chains formed by copolymerizating olefinic perfluorocarbons and olefinic hydrocarbons, and said side chains are crosslinked polymers of sulfonic acid group-containing olefinic hydrocarbons and diolefinic hydrocarbons.

4. The solid polyelectrolyte fuel cell of claim 2, wherein said solid polyelectrolyte membrane comprises a copolymer comprising main chains and side chains, said main chains comprising groups represented by:

(I)

wherein

$R^1$ represents a fluorine atom, or a fluoroalkyl group having from 1 to 3 carbon atoms;

$R^2$ represents a hydrogen atom, or an alkyl group having from 1 to 3 carbon atoms;

m represents an integer of 1 or more; and n represents an integer of 1 or more; and said side chains comprising groups represented by:

(II)

wherein $R^3$, $R^4$ and $R^5$ each independently represent a hydrogen atom, or an alkyl group having from 1 to 3 carbon atoms;

s represents an integer of 1 or more; and t represents 0 or an integer of 1 to more.

5. The solid polyelectrolyte fuel cell of claim 2, wherein said fluorocarbon vinyl monomers are tetrafluoroethylene, and said hydrocarbon vinyl monomers are ethylene.

6. The solid polyelectrolyte fuel cell of claim 4, wherein $R^1$ represents a fluorine atom, and $R^2$ represents a hydrogen atom.

7. The solid polyelectrolyte fuel cell of claim 2, wherein said side chains are styrene-sulfonic acid polymer.

8. The solid polyelectrolyte fuel cell of claim 2, wherein the ion-exchange capacity of said solid polyelectrolyte membrane is regulated by controlling concentration of said sulfonic acid group.

9. The solid polyelectrolyte fuel cell of claim 8, wherein said concentration of sulfonic acid group is controlled by contacting, with sulfonic agent, only one surface of a film from which said solid polyelectrolyte membrane is formed.

10. The solid polyelectrolyte fuel cell of claim 2, wherein said side chains are graft-copolymerizing side chains; and the ion-exchange capacity of said solid polyelectrolyte membrane is regulated by controlling a degree of grafting which is the degree of grafting reaction for forming said side chain.

11. A solid polyelectrolyte fuel cell, comprising:

(a) a positive electrode, (b) a negative electrode, and (c) a solid polyelectrolyte membrane containing water, between said positive electrode and said negative electrode, wherein the degree of crosslinking of a portion of said solid polyelectrolyte membrane adjacent to said positive electrode is greater than the degree of crosslinking of a portion of said solid polyelectrolyte membrane adjacent to said negative electrode, and the degree of crosslinking of said solid polyelectrolyte membrane varies continuously from said portion of said solid polyelectrolyte membrane adjacent to said positive electrode to said portion of said solid polyelectrolyte membrane adjacent to said negative electrode.

12. The solid polyelectrolyte fuel cell of claim 11, wherein said solid polyelectrolyte membrane comprises a copolymer comprising main chains and side chains, said main chains formed by copolymerizating fluorocarbon vinyl monomers and hydrocarbon vinyl monomers, and said side chains are sulfonic acid group-containing hydrocarbon side chains.

13. The solid polyelectrolyte fuel cell of claim 11, wherein said solid polyelectrolyte membrane comprises a copolymer comprising main chains and side chains, said main chains formed by copolymerizating olefinic perfluorocarbons and olefinic hydrocarbons, and said side chains are crosslinked polymers of sulfonic acid group-containing olefinic hydrocarbons and diolefinic hydrocarbons.

14. The solid polyelectrolyte fuel cell of claim 12, wherein said solid polyelectrolyte membrane comprises a copolymer comprising main chains and side chains, said main chains comprising groups represented by:

(I)

wherein

$R^1$ represents a fluorine atom, or a fluoroalkyl group having from 1 to 3 carbon atoms;

$R^2$ represents a hydrogen atom, or an alkyl group having from 1 to 3 carbon atoms;

m represents an integer of 1 or more; and n represents an integer of 1 or more; and said side chains comprising groups represented by:

(II)

wherein

R³, R⁴ and R⁵ each independently represent a hydrogen atom, or an alkyl group having from 1 to 3 carbon atoms;

s represents an integer of 1 or more; and t represents 0 or an integer of 1 to more.

15. The solid polyelectrolyte fuel cell of claim 12, wherein said fluorocarbon vinyl monomers are tetrafluoroethylene, and said hydrocarbon vinyl monomers are ethylene.

16. The solid polyelectrolyte fuel cell of claim 14, wherein $R^1$ represents a fluorine atom, and $R^2$ represents a hydrogen atom.

17. The solid polyelectrolyte fuel cell of claim 12, wherein said side chains are styrene-sulfonic acid polymer.

18. The solid polyelectrolyte fuel cell of claim 11, wherein said degree of crosslinking is controlled by contacting, with crosslinking material, only one surface of a film from which said solid polyelectrolyte membrane is formed.

* * * * *